(12) United States Patent
Ishizaki

(10) Patent No.: US 9,919,747 B2
(45) Date of Patent: Mar. 20, 2018

(54) VEHICLE SIDE IMPACT SENSING ASSEMBLY

(71) Applicant: HONDA MOTOR CO., LTD., Minato-ku, Tokyo (JP)

(72) Inventor: Yuta Ishizaki, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/227,288

(22) Filed: Aug. 3, 2016

(65) Prior Publication Data

US 2017/0036629 A1 Feb. 9, 2017

(30) Foreign Application Priority Data

Aug. 5, 2015 (JP) ................................. 2015-155227

(51) Int. Cl.
*B62D 25/20* (2006.01)
*B60R 21/013* (2006.01)
*B60R 21/01* (2006.01)

(52) U.S. Cl.
CPC ........ *B62D 25/2036* (2013.01); *B60R 21/013* (2013.01); *B60R 2021/01006* (2013.01)

(58) Field of Classification Search
CPC .............. B62D 25/2036; B60R 21/013; B60R 2021/01006; B60R 2021/0006
See application file for complete search history.

(56) References Cited

U.S. PATENT DOCUMENTS

| 6,529,810 | B2 * | 3/2003 | Foo | ........................ | B60R 21/013 180/271 |
| 7,540,343 | B2 * | 6/2009 | Nakashima | .............. | B60K 1/00 180/65.1 |
| 7,600,799 | B2 * | 10/2009 | Araki | ........................ | B60R 7/04 280/735 |
| 7,605,691 | B2 * | 10/2009 | Nonaka | ............... | B60R 21/0136 340/425.5 |
| 7,896,115 | B2 * | 3/2011 | Ono | ........................ | B60K 1/04 180/65.31 |
| 8,142,724 | B2 * | 3/2012 | Suzuki | .............. | H01M 8/04089 422/83 |

(Continued)

FOREIGN PATENT DOCUMENTS

JP 09272466 A * 10/1997
JP 10044922 A * 2/1998
(Continued)

*Primary Examiner* — Laura Freedman
(74) *Attorney, Agent, or Firm* — Carrier Blackman & Associates, P.C.; Joseph P. Carrier; Jeffrey T. Gedeon

(57) ABSTRACT

A vehicle side impact sensing assembly includes a side impact sensor installed on a center tunnel and a bracket, for mounting the sensor, arranged on an upper end portion of the tunnel. The sensor senses a side impact load acting sideways on a body. The bracket has a substantially M-shaped section, is a member put on the upper end portion of the tunnel and includes left and right vertical-plate-like legs and a horizontal-plate-like middle portion. T legs are overlaid on and joined to left and right side surfaces or an upper surface of the tunnel. The middle portion is lower than upper ends of the legs, and overlaid on and joined to the upper surface of the tunnel. Left and right mounting portions for mounting the side impact sensor are formed between the middle portion and the upper ends of the legs.

5 Claims, 5 Drawing Sheets

(56) References Cited

U.S. PATENT DOCUMENTS 9,327,666 B2 * 5/2016 Sassi .................. B60R 21/0136

FOREIGN PATENT DOCUMENTS

| JP | 10-114256 A | | 5/1998 |
|----|------------|---|--------|
| JP | 2000142285 A | * | 5/2000 |
| JP | 2007015613 A | * | 1/2007 |
| JP | 2009179182 A | * | 8/2009 |
| JP | 2009179302 A | * | 8/2009 |

* cited by examiner

Ri ⟷ Le

US 9,919,747 B2

VEHICLE SIDE IMPACT SENSING ASSEMBLY

BACKGROUND OF THE INVENTION

Field of the Invention

The present invention relates to a technique of improving a vehicle side impact sensing assembly in which a side impact sensor is installed on a center tunnel.

Description of the Related Art

A center tunnel is positioned in the center of the vehicle body in the vehicle width direction, and extends in the back-and-fourth direction of the vehicle body. A side impact sensor installed on this center tunnel senses an impact load which acts sideways on the vehicle body, that is, a so-called side impact load, and outputs an expansion signal to an airbag. A vehicle side impact sensing assembly having an arrangement like this is known from, for example, Japanese Patent Laid-Open No. 10-114256.

In this vehicle side impact sensing assembly known by Japanese Patent Laid-Open No. 10-114256, a horizontal-plate-like bracket (reinforcement) is formed on the upper surface of the center tunnel. This bracket is overlaid on the upper surface of the center tunnel, and mounting flanges projecting downward are formed on the two sides in the vehicle width direction. The left and right mounting flanges are attached to the left and right side surfaces of the center tunnel. A boss portion projecting upward is formed on the upper surface of the bracket. A side impact sensor is screwed to the upper surface of this boss portion.

It is necessary to firmly fix the bracket to the center tunnel in order to sufficiently and rapidly transmit a side impact load from the center tunnel to the side impact sensor while minimizing damping.

Generally, the height of the center tunnel is determined by taking account of various requirements demanded for each vehicle type, for example, the rigidity and strength of the whole vehicle body, the layout relationship between various members (for example, a shift lever and parking brake) positioned near the center tunnel, and the comfortableness of the interior. On the other hand, to increase the degree of freedom of design, it is preferable to be able to uniquely set the height of the side impact sensor independently of the height of the center tunnel.

In Japanese Patent Laid-Open No. 10-114256, it is possible to appropriately set the height of the upper surface of the bracket with respect to the center tunnel. To this end, the length of the left and right mounting flanges in the vertical direction need only be increased in accordance with the increase in height of the upper surface of the bracket with respect to the center tunnel. However, the lower surface of the horizontal-plate-like bracket is spaced apart upward from the upper surface of the center tunnel. This makes it impossible to unlimitedly firmly fix the bracket to the center tunnel. Also, when the bracket has the arrangement like this, the rigidity of the bracket itself cannot unlimitedly be increased. Accordingly, some improvement is necessary to sufficiently and rapidly transmit a side impact load from the center tunnel to the side impact sensor while minimizing damping. However, if the arrangement of the bracket is complicated, the manufacturing cost of the bracket increases.

SUMMARY OF THE INVENTION

It is an object of the present invention to provide a technique capable of optimally setting the height of a side impact sensor in accordance with each vehicle type and regardless of the height of a center tunnel, and rapidly transmitting a side impact load from the center tunnel to a side impact sensor while minimizing damping.

According to an aspect of the present invention, there is provided a vehicle side impact sensing assembly comprising: a side impact sensor installed on a center tunnel positioned in a vehicle width center of a body and extending in a vehicle longitudinal direction; and a bracket arranged on an upper end portion of the center tunnel and configured to mount the side impact sensor, wherein the side impact sensor senses a side impact load acting sideways on the body, and outputs an expansion signal to left and right side curtain airbag devices, the bracket is formed to have a substantially M-shaped section when viewed from a front part of the body, the bracket is a member put on the upper end portion of the center tunnel, the bracket includes left and right vertical-plate-like legs having plate surfaces pointing a vehicle width direction, and a horizontal-plate-like middle portion positioned between the left and right legs and having a plate surface pointing a vertical direction, the left and right legs are overlaid on and joined to left and right side surfaces or an upper surface of the center tunnel, the middle portion is set to be lower than upper ends of the left and right legs, and overlaid on and joined to the upper surface of the center tunnel, and left and right mounting portions for mounting the side impact sensor are formed between the middle portion and the upper ends of the left and right legs.

Further features of the present invention will become apparent from the following description of exemplary embodiments (with reference to the attached drawings).

DESCRIPTION OF THE EMBODIMENTS

An embodiment according to the present invention will be explained below with reference to the accompanying drawings. Note that "front", "rear", "left", "right", "upper", and "lower" of the vehicle body are directions viewed from a driver, and Fr, Rr, Le, and Ri respectively indicate the front side, rear side, left side, and right side.

Figure 1:
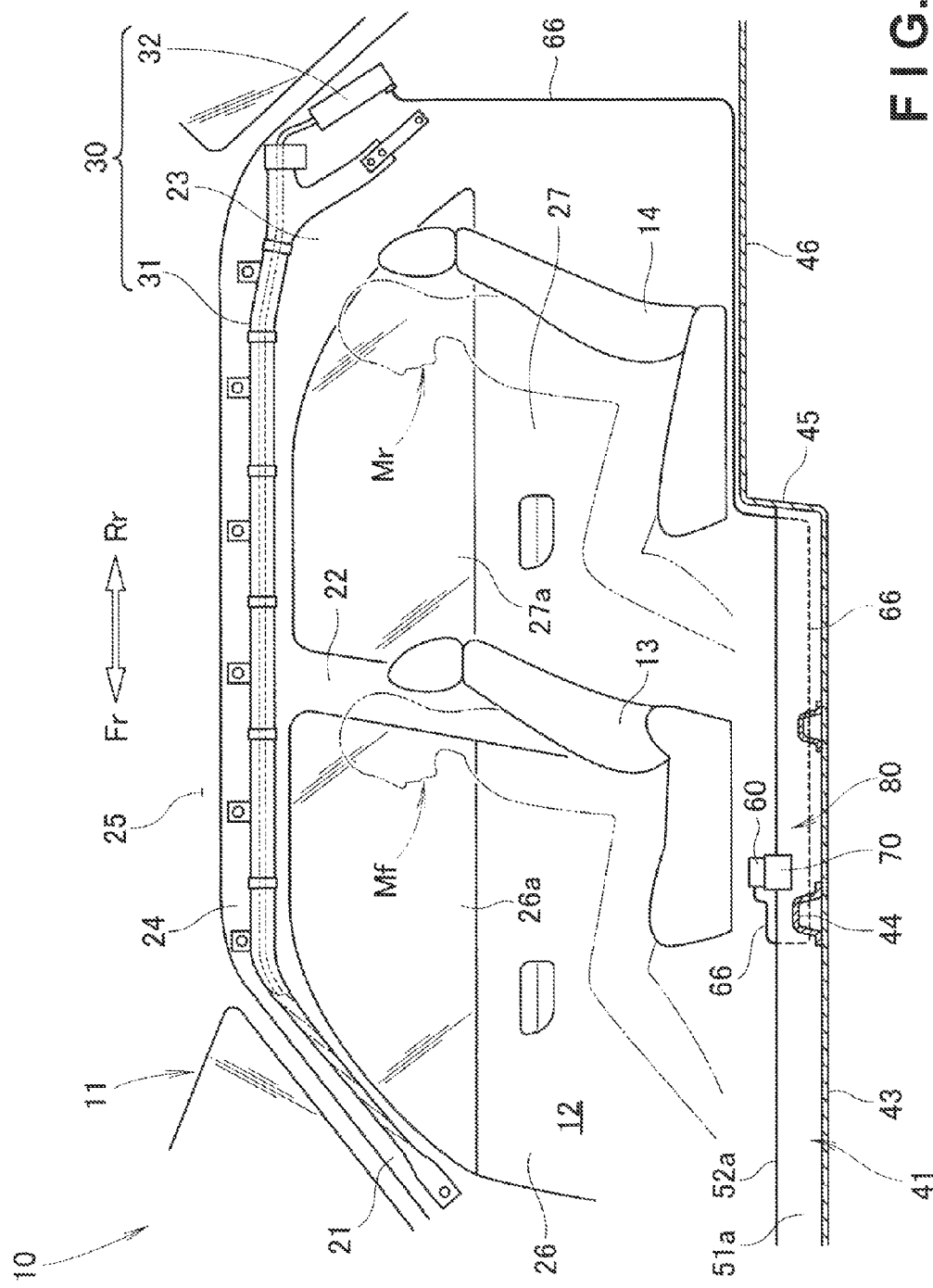
FIG. 1 is a side view showing, from the interior side, a vehicle including a vehicle side impact sensing assembly according to the present invention.

As shown in FIG. 1, a vehicle 10 such as an automobile has a monocoque body 11. The body 11 is formed to be practically symmetrical with respect to a vehicle width central line CL (see FIG. 2) extending in the vehicle front-rear direction through the center of the vehicle 10 in the vehicle width direction. The vehicle 10 is a four-seater automobile including front seats 13 (a driver seat and passenger seat) and rear seats 14 in an interior 12 formed by the body 11.

The left and right side portions of the body 11 include left and right front pillars 21, left and right center pillars 22, left and right rear pillars 23, and left and right roof side rails 24 connected to the upper ends of the left and right pillars 21, 22, and 23. The left and right roof side rails 24 narrowly extend in the vehicle longitudinal direction of the body 11, and support a roof 25. Left and right front side doors 26 are installed in a front opening between the left and right front pillars 21 and left and right center pillars 22. Left and right rear side doors 27 are installed in a rear opening between the left and right center pillars 22 and left and right rear pillars 23. The left and right front side doors 26 include windows 26a in the upper half portions. The left and right rear side doors 27 also include windows 27a in the upper half portions.

Left and right side curtain airbag devices 30 are installed on the left and right roof side rails 24. The left and right side curtain airbag devices 30 include left and right side curtain airbags 31 and left and right inflators 32 (gas supply sources 32). The left and right side curtain airbags 31 are accommodated along the side edges of the roof 25. The left and right inflators 32 are attached to the left and right rear pillars 23, and connected to the left and right side curtain airbags 31.

When receiving an impact load acting sideways on the body 11, the left and right inflators 32 generate a gas and supply the gas to the left and right side curtain airbags 31. Accordingly, the left and right side curtain airbags 31 expand toward the interior 12 along the windows 26a and 27a. As a consequence, the left and right side curtain airbags 31 cover the windows 26a and 27a, and smoothly absorb impact acting on occupants Mf and Mr sitting in the seats 13 and 14, thereby protecting the occupants Mf and Mr.

Figure 2:
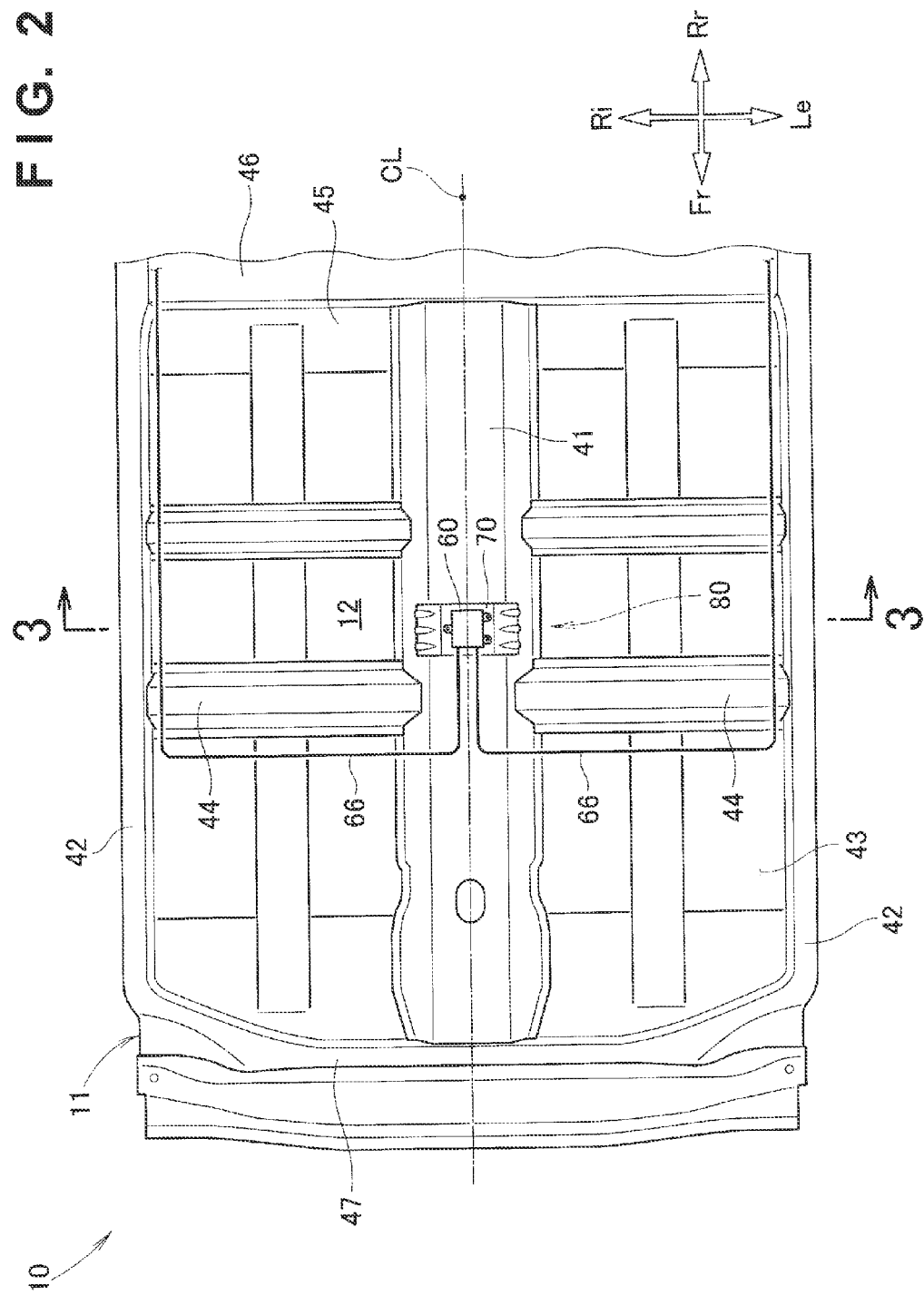
FIG. 2 is a plan view of the interior of the vehicle body shown in FIG. 1.
Figure 3:
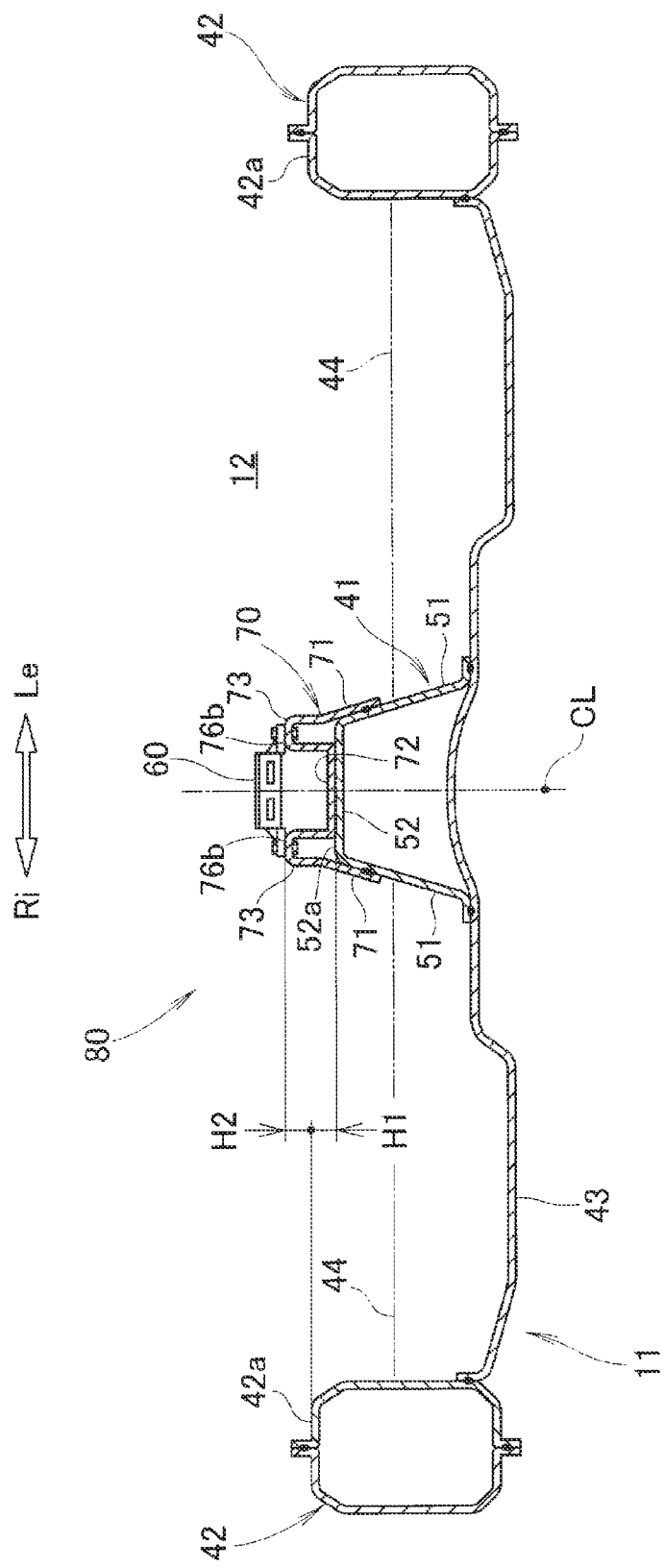
FIG. 3 is a sectional view taken along a line 3-3 in FIG. 2.

As shown in FIGS. 1 to 3, the lower part of the body 11 includes a center tunnel 41, left and right side sills 42, a floor panel 43, and left and right floor cross members 44.

The center tunnel 41 is positioned in the vehicle width center of the body 11, and extends in the vehicle longitudinal direction. The left and right side sills 42 are positioned on the two sides of the body 11 in the vehicle width direction, and extend in the vehicle longitudinal direction. The floor panel 43 is extended between the left and right side sills 42, and forms the lower surface of the interior 12.

The left and right floor cross members 44 are extended between and joined to the center tunnel 41 and left and right side sills 42, and reinforce the floor panel 43. The floor cross members 44 are positioned in an almost center of the body 11 in the vehicle longitudinal direction, that is, in an almost center from the front end to the rear end of the body 11. Furthermore, the left and right floor cross members 44 are positioned just under the front end portions of the front seats 13 (the driver seat and passenger seat).

The center tunnel 41 and left and right floor cross members 44 are overlaid on and joined to the upper surface of the floor panel 43.

The body 11 further includes a kick-up portion 45 standing from the rear end of the floor panel 43, and a rear floor 46 extending backward from the upper end of the kick-up portion 45. Accordingly, the center tunnel 41 extends from a dashboard lower portion 47 defining the front portion of the interior 12 to the kick-up portion 45.

The center tunnel 41 will be explained in detail below. As shown in FIG. 3, the center tunnel 41 is a product formed by bending one metal plate, and is formed to have an almost inverted U-shaped section when viewed from the front part of the body. More specifically, the center tunnel 41 is an integrally molded product including left and right leg plates 51 extending upward from the floor panel 43, and a top plate 52 between the upper ends of the left and right leg plates 51. The left and right leg plates 51 are vertical-plate-like portions having plate surfaces pointing the vehicle width direction. The top plate 52 is an almost horizontal plate-like portion having plate surfaces pointing the vertical direction.

A side impact sensor 60 is installed on the center tunnel 41. As shown in FIGS. 1 to 3, the side impact sensor 60 senses an impact load acting sideways on the body 11, that is, a so-called side impact load, and outputs an expansion signal to the left and right side curtain airbag devices 30 (that is, the inflators 32).

Figure 4:
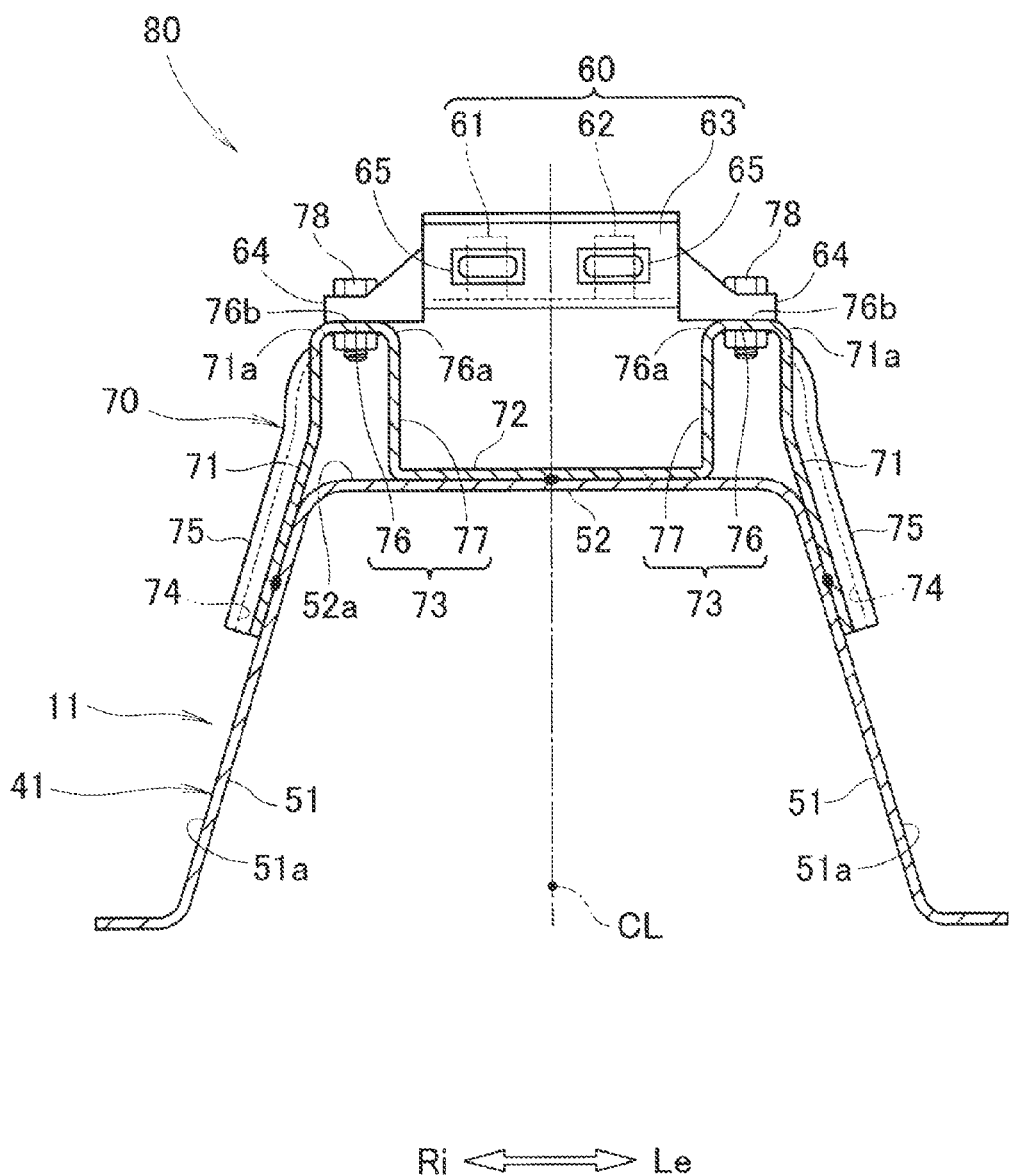
FIG. 4 is an enlarged view of a center tunnel, bracket, and side impact sensor shown in FIG. 3.

As shown in FIG. 4, the side impact sensor 60 includes a side impact sensing element 61, a bag expansion control unit 62, and a case 63. The side impact sensing element 61 senses an impact load (side impact load) acting sideways on the body 11. Based on the sensing signal from the side impact sensing element 61, the bag expansion control unit 62 outputs an expansion signal to the inflators 32 of the left and right side curtain airbag devices 30 shown in FIG. 1. The case 63 accommodates the side impact sensing element 61 and bag expansion control unit 62.

The case 63 includes a plurality of (for example, three) mounting legs 64 and two harness connecting terminals 65. The mounting legs 64 extend outward in the vehicle width direction from the left and right side surfaces of the case 63. As shown in FIG. 1, harnesses 66 for sending an expansion signal (electrical signal) to the left and right side curtain airbag devices 30 are connected to the harness connecting terminals 65.

A bracket 70 for mounting the side impact sensor 60 is arranged on the upper end portion of the center tunnel 41. As shown in FIGS. 1 and 2, the bracket 70 is positioned close to the left and right floor cross members 44. For example, the bracket 70 is positioned slightly behind the left and right floor cross members 44. When the vehicle 10 is viewed sideways, therefore, the bracket 70 and side impact sensor 60 are positioned under the front seats 13 (the driver seat and passenger seat).

Figure 5:
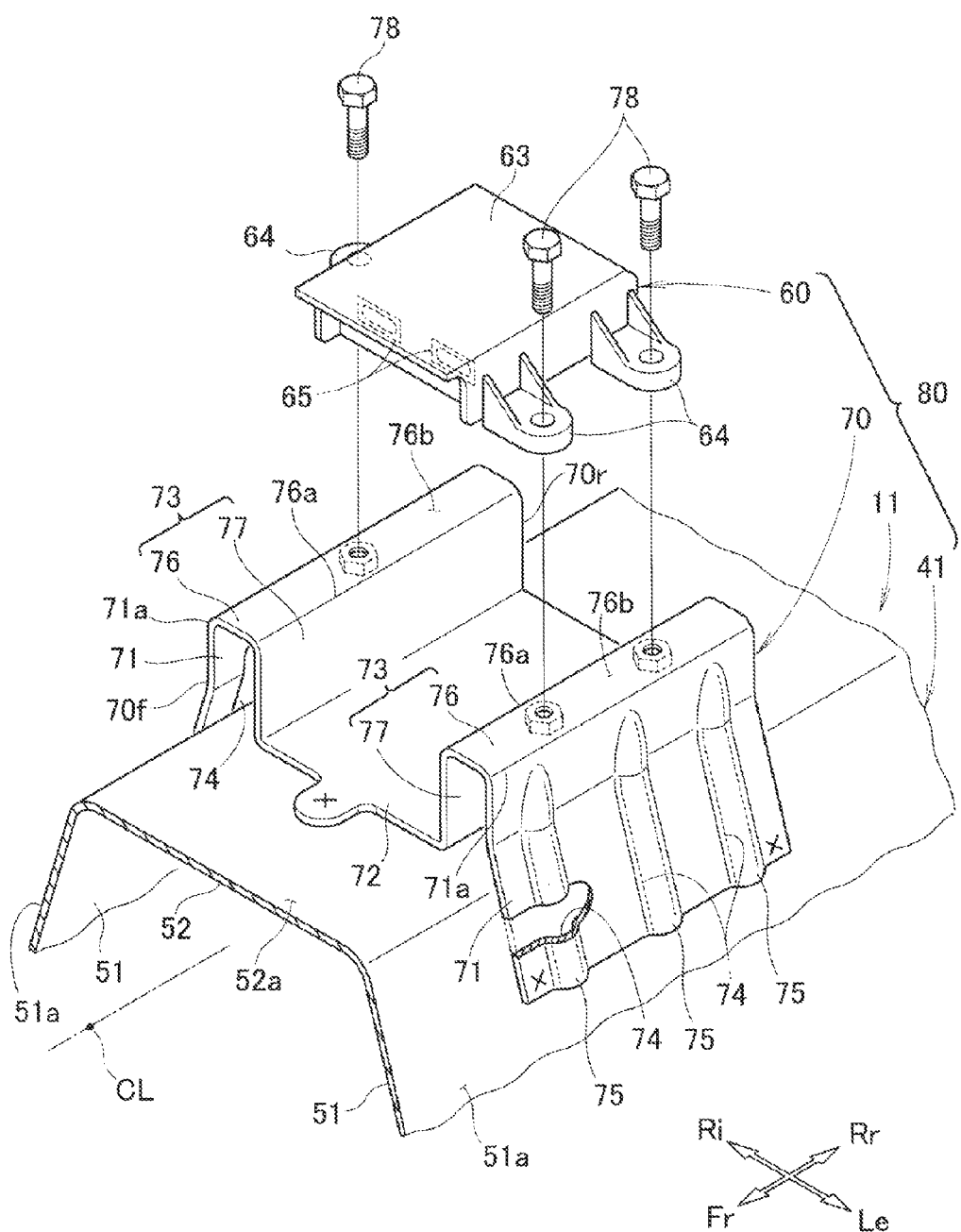
FIG. 5 is an exploded perspective view of the center tunnel, bracket, and side impact sensor shown in FIG. 4.

As shown in FIGS. 4 and 5, the bracket 70 is a product formed by bending one metal plate, and is formed to have an almost M-shaped section when viewed from the front part of the body. A front end 70f and a rear end 70r of the bracket 70 are open ends open in the vehicle longitudinal direction. The bracket 70 is a member put on the upper end portion of the center tunnel 41, and including left and right vertical-plate-like legs 71, a horizontal-plate-like middle portion 72 positioned between the left and right legs 71, and left and right mounting portions 73 formed between the middle portion 72 and upper ends 71a of the left and right legs 71.

The left and right legs 71 have plate surfaces pointing the vehicle width direction, and are overlaid on and joined to left and right side surfaces 51a of the center tunnel 41 (surfaces 51a of the left and right leg plates 51, which are positioned on the outside in the vehicle width direction). Beads 74 extending in the vertical direction of the body 11 are formed on the left and right legs 71. For example, a plurality of beads 74 arrayed in the vehicle longitudinal direction are formed on the inner surface of the left leg 71 in the vehicle width direction. The plurality of beads 74 extend from the lower end to the upper end of the left leg 71. This applies to the right leg 71 as well.

The left and right beads 74 are grooves formed by embossing on the left and right vertical-plate-like legs 71. Since the left and right beads 74 extend in the vertical direction of the body 11, left and right projecting lines 75 extending in the vertical direction of the body are formed on the left and right legs 71. The left and right projecting lines 75 can function as reinforcing ribs elongated in the longitudinal direction. Consequently, the left and right legs 71 are reinforced by the left and right projecting lines 75. Accordingly, the rigidity of the bracket 70 can further be increased. In addition, the left and right legs 71 having the increased rigidity as described above are overlaid on and joined to the left and right side surfaces 51a of the center tunnel 41. Therefore, the left and right high-rigidity side surfaces 51a can increase the rigidity of the center tunnel 41 (particularly, the upper portion).

The plate surfaces of the middle portion 72 point the vertical direction. The middle portion 72 is set to be lower than the upper ends 71a of the left and right legs 71, and overlaid on and joined to the upper surface 52a of the center tunnel 41 (the upper surface 52a of the top plate 52).

The left and right mounting portions 73 are portions for mounting the side impact sensor 60. The left and right mounting portions 73 include left and right horizontal-plate-like mounting plates 76 extending toward the vehicle width center CL from the upper ends 71a of the left and right legs 71, and left and right vertical-plate-like inner plates 77 extending downward to the middle portion 72 from distal ends 76a of the left and right mounting plates 76. The left and right mounting plates 76 have plate surfaces pointing the vertical direction, and are almost horizontal. The plate surfaces of the left and right inner plates 77 point the vehicle width direction.

The side impact sensor 60 is mounted on the left and right mounting portions 73, that is, an upper surfaces 76b of the left and right mounting plates 76. More specifically, the mounting legs 64 formed on the case 63 of the side impact sensor 60 are overlaid on the upper surfaces 76b of the left and right mounting plates 76, and detachably mounted on the left and right mounting plates 76 by a plurality of bolts 78 (including machine screws).

The body 11, side impact sensor 60, and bracket 70 form a vehicle side impact sensing assembly 80.

As shown in FIG. 3, the upper surface 52a of the center tunnel 41 is set to be lower by a height H1 than upper surfaces 42a of the left and right side sills 42. The comfortableness of the interior 12 can be increased by lowering the center tunnel 41.

The upper surfaces 76b of the left and right mounting portions 73 (that is, the upper surfaces 76b of the mounting plates 76) are set to be higher by a height H2 than the upper surfaces 42a of the left and right side sills 42. Consequently, the height (ground clearance) of the side impact sensor 60 mounted on the left and right mounting portions 73 is larger than that of the upper surfaces 42a of the left and right side sills 42. Therefore, if, for example, the vehicle is semi-submerged, the interior 12 is flooded from outside the vehicle, and the water level has reached the upper surfaces 42a of the left and right side sills 42, there is no fear that the side impact sensor 60 mounted on the left and right mounting portions 73 is under water.

As described above, it is possible to improve the comfortableness of the interior 12 by lowering the upper surface 52a of the center tunnel 41, and improve the protecting performance on the side impact sensor 60 at the same time.

As shown in FIGS. 1 and 2, the harnesses 66 for transmitting an electrical signal to the left and right side curtain airbag devices 30 are connected to the side impact sensor 60. The harnesses 66 extend outward in the vehicle width direction along the left and right floor cross members 44 from the side impact sensor 60, further extend backward along the left and right side sills 42, and are connected to the left and right inflators 32 by extending upward. This facilitates leading (wiring) the harnesses 66 with respect to the floor panel 43 of the interior 12.

An impact load acting sideways on a side portion of the front half part of the body 11 will be called "a front side impact load". An impact load acting sideways on a side portion of the rear half part of the body 11 will be called "a rear side impact load". Both the front and rear side impact loads are transmitted from the left and right side sills 42 to the center tunnel 41 through the left and right floor cross members 44 positioned in almost the center of the body 11 in the vehicle longitudinal direction. Then, each side impact load is transmitted from the center tunnel 41 to the side impact sensor 60 via the bracket 70.

As described above, only one side impact sensor 60 positioned in almost the center of the body 11 in the vehicle longitudinal direction can sense both the front and rear side impact loads. Accordingly, the total length of the harnesses 66 can largely be decreased compared to a case in which different side impact sensors sense the front and rear side impact loads.

A summary of the above explanation is as follows. As shown in FIG. 4, the bracket 70 is formed to have an almost M-shaped section when viewed from the front part of the body. The height of the left and right mounting portions 73 can easily be designed at an optimum height with respect to the upper surface 52a of the center tunnel 41 by changing the height from the middle portion 72 to the left and right mounting portions 73 (to the upper surfaces 76b of the left and right mounting plates 76), and changing the length of the left and right legs 71 in the vertical direction. This makes it possible to set the height of the side impact sensor 60 to be optimum for each vehicle type regardless of the height of the center tunnel 41.

In addition, the bracket 70 is overlaid on and joined to at least three portions of the left and right side surfaces 51a and upper surface 52a of the center tunnel 41. Therefore, even when the height from the upper surface 52a of the center tunnel 41 to the left and right mounting portions 73 (to the upper surfaces 76b of the left and right mounting plates 76) is large, the left and right mounting portions 73 can firmly be fixed to the center tunnel 41. The bracket 70 can sufficiently and rapidly transmit a side impact load from the center tunnel 41 to the left and right mounting portions 73 while minimizing damping. Accordingly, the side impact sensor 60 can correctly and rapidly sense the side impact load, and accurately and timely output an expansion signal to the left and right side curtain airbags 31 (see FIG. 1). As a consequence, it is possible to further increase the occupant protecting performance by the left and right side curtain airbags 31.

Furthermore, as shown in FIG. 5, the bracket 70 is a product formed by bending one metal plate. The front end 70f and rear end 70r of the bracket 70 are open ends open in the vehicle longitudinal direction. The left and right mounting portions 73 include the left and right horizontal-plate-like mounting plates 76 extending toward the vehicle width center CL from the upper ends 71a of the left and right legs 71, and the left and right vertical-plate-like inner plates 77 extending downward from the distal ends 76a of the left and right mounting plates 76 to the middle portion 72. Since the bracket 70 has a simple shape as described above, the bracket 70 can easily be manufactured by bending forming of one metal plate.

Moreover, as shown in FIG. 2, the left and right floor cross members 44 are positioned in almost the center of the body 11 in the vehicle longitudinal direction. The bracket 70 is positioned near the left and right floor cross members 44. Therefore, the bracket 70 and side impact sensor 60 positioned near the left and right floor cross members 44 are also positioned in almost the center of the body 11 in the vehicle longitudinal direction. In addition, as described previously, the side impact sensor 60 is installed on the center tunnel 41 positioned in the vehicle width center of the body 11. That is, the side impact sensor 60 is positioned in the vehicle width center of the body 11 and in almost the center of the body 11 in the vehicle longitudinal direction. This makes it possible to sufficiently protect the side impact sensor 60 from both a side impact load and a load in the vehicle longitudinal direction.

Also, as described previously, both the front and rear side impact loads are sufficiently and rapidly transmitted from the left and right side sills 42 to the center tunnel 41 through the left and right floor cross members 44 positioned in almost the center of the body 11 in the vehicle longitudinal direction. Then, each side impact load is sufficiently and rapidly transmitted from the center tunnel 41 to the side impact sensor 60 via the bracket 70. Thus, only one side impact sensor 60 positioned in almost the center of the body 11 in the vehicle longitudinal direction can correctly and rapidly sense both the front and rear side impact loads. Accordingly, the side impact sensor 60 can accurately and timely output an expansion signal to the left and right side curtain airbags 31.

In this embodiment, the side impact sensor 60 includes an arrangement having only the side impact sensing element 61, and an arrangement accommodating only the side impact sensing element 61 in the case 63.

Also, in this embodiment, the left and right legs 71 of the bracket 70 need only be overlaid on and joined to the left and right side surfaces 51a or upper surface 52a of the center tunnel 41. For example, the left and right legs 71 include an arrangement in which the left and right legs 71 are overlaid on, from above, and joined to the left and right ends, or their vicinities, of the upper surface 52a of the center tunnel 41. When the left and right legs 71 are thus overlaid on the upper surface 52a, the degree of freedom of layout increases compared to an arrangement in which the left and right legs 71 are overlaid on the left and right side surfaces 51a.

The vehicle side impact sensing assembly 80 of this embodiment is suitably applied to an automobile.

<Summary of Embodiment>

1. The vehicle side impact sensing assembly of the abovementioned embodiment comprises:
    a side impact sensor installed on a center tunnel positioned in a vehicle width center of a body and extending in a vehicle longitudinal direction; and
    a bracket arranged on an upper end portion of the center tunnel and configured to mount the side impact sensor,
    wherein the side impact sensor senses a side impact load acting sideways on the body, and outputs an expansion signal to left and right side curtain airbag devices,
    the bracket is formed to have a substantially M-shaped section when viewed from a front part of the body,
    the bracket is a member put on the upper end portion of the center tunnel,
    the bracket includes left and right vertical-plate-like legs having plate surfaces pointing a vehicle width direction, and a horizontal-plate-like middle portion positioned between the left and right legs and having a plate surface pointing a vertical direction,
    the left and right legs are overlaid on and joined to left and right side surfaces or an upper surface of the center tunnel,
    the middle portion is set to be lower than upper ends of the left and right legs, and overlaid on and joined to the upper surface of the center tunnel, and
    left and right mounting portions for mounting the side impact sensor are formed between the middle portion and the upper ends of the left and right legs.

In this arrangement, the bracket is formed to have an almost M-shaped section when viewed from the front part of the body. The height of the left and right mounting portions can easily be designed at an optimum height with respect to the upper surface of the center tunnel by changing the height from the middle portion to be overlaid on the upper surface of the center tunnel to the left and right mounting portions, and changing the length of the left and right legs in the vertical direction. This makes it possible to set the height of the side impact sensor to be optimum for each vehicle type regardless of the height of the center tunnel.

In addition, the bracket is overlaid on and joined to at least three portions of the left and right side surfaces and upper surface of the center tunnel. Therefore, even when the height from the upper surface of the center tunnel to the left and right mounting portions is large, the left and right mounting portions can firmly be fixed to the center tunnel. The bracket can sufficiently and rapidly transmit a side impact load from the center tunnel to the left and right mounting portions while minimizing damping. Accordingly, the side impact sensor can correctly and rapidly sense the side impact load, and accurately and timely output an expansion signal to the left and right side curtain airbags. As a consequence, it is possible to further increase the occupant protecting performance by the left and right side curtain airbags. Furthermore, the arrangement can be simplified because the bracket is formed to have an almost M-shaped section when viewed from the front part of the body.

In this embodiment as described above, the height of the side impact sensor can be set to be optimum for each vehicle type regardless of the height of the center tunnel. In addition, even when the height from the upper surface of the center tunnel to the mounting portions of the bracket is large, a side impact load can rapidly be transmitted from the center tunnel to the side impact sensor while minimizing damping. Furthermore, the arrangement can be simplified because the bracket is formed to have an almost M-shaped section when viewed from the front part of the body.

2. In the vehicle side impact sensing assembly of the abovementioned embodiment beads extending in a vertical direction of the body are formed on the left and right legs.

The beads are grooves formed by embossing on the left and right vertical-plate-like legs. Since the beads extend in the vertical direction of the body, projecting lines extending in the vertical direction of the body are formed on the left and right legs. The projecting lines can function as elongated reinforcing ribs in the longitudinal direction. Consequently, the left and right legs are reinforced by the projecting lines. Accordingly, the rigidity of the bracket can further be increased.

3. In the vehicle side impact sensing assembly of the abovementioned embodiment, the bracket is a product formed by bending one metal plate,
    a front end and a rear end of the bracket are open ends open in the vehicle longitudinal direction, and
    the left and right mounting portions include:
    left and right horizontal-plate-like mounting plates extending toward the vehicle width center from the upper ends of the left and right legs; and
    a vertical-plate-like inner plate extending downward from distal ends of the left and right mounting plates to the middle portion.

In this arrangement, the bracket has a simple shape and hence can easily be manufactured by bending forming of one metal plate.

4. The vehicle side impact sensing assembly of the above-mentioned embodiment further comprises left and right side sills positioned on two sides of the body in the vehicle width direction, and extending in the vehicle longitudinal direction, wherein the upper surface of the center tunnel is set to be lower than upper surfaces of the left and right side sills, and an upper surface of the mounting portion is set to be higher than the upper surfaces of the left and right side sills.

In this arrangement, the comfortableness of the interior can be increased by lowering the center tunnel.

Also, the height (ground clearance) of the side impact sensor mounted on the mounting portions of the bracket is larger than that of the upper surfaces of the left and right side sills. Therefore, if, for example, the vehicle is semi-submerged, the interior is flooded from outside the vehicle, and the water level has reached the upper surfaces of the side sills, there is no fear that the side impact sensor mounted on the mounting portions is under water. It is thus possible to improve the comfortableness of the interior by lowering the upper surface of the center tunnel, and improve the protecting performance on the side impact sensor at the same time.

5. The vehicle side impact sensing assembly of the above-mentioned embodiment further comprises left and right floor cross members extended between the center tunnel and the left and right side sills, and configured to reinforce a floor panel, wherein the left and right floor cross members are positioned in substantially a center of the body in the vehicle longitudinal direction, the bracket is positioned near the left and right floor cross members, a harness for sending the expansion signal to the left and right side curtain airbags is connected to the side impact sensor, and the harness extends outward in the vehicle width direction along the left and right floor cross members from the side impact sensor.

In this arrangement, the bracket and side impact sensor positioned near the left and right floor cross members are also positioned in almost the center of the body in the vehicle longitudinal direction. In addition, as described previously, the side impact sensor is installed on the center tunnel positioned in the vehicle width center of the body. That is, the side impact sensor is positioned in the vehicle width center of the body and in almost the center of the body in the vehicle longitudinal direction. This makes it possible to sufficiently protect the side impact sensor from both a side impact load and a load in the vehicle longitudinal direction.

An impact load acting sideways on a side portion of the front half part of the body 11 is called "a front side impact load". An impact load acting sideways on a side portion of the rear half part of the body 11 is called "a rear side impact load". Both the front and rear side impact loads are sufficiently and rapidly transmitted from the left and right side sills to the center tunnel through the left and right floor cross members positioned in almost the center of the body in the vehicle longitudinal direction. Then, each side impact load is sufficiently and rapidly transmitted from the center tunnel to the side impact sensor via the bracket. Thus, only one side impact sensor positioned in almost the center of the body in the vehicle longitudinal direction can correctly and rapidly sense both the front and rear side impact loads. Accordingly, the side impact sensor can accurately and timely output an expansion signal to the left and right side curtain airbags.

Also, this arrangement facilitates leading (wiring) the harnesses with respect to the floor panel of the interior. In addition, as described above, only one side impact sensor positioned in almost the center of the body in the vehicle longitudinal direction can sense both the front and rear side impact loads. Therefore, the total length of the harnesses can largely be decreased compared to a case in which different side impact sensors sense the front and rear side impact loads.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2015-155227, filed Aug. 5, 2015, which is hereby incorporated by reference herein in its entirety.

What is claimed is:

1. A vehicle side impact sensing assembly comprising:
a side impact sensor installed on a center tunnel positioned in a vehicle width center of a body and extending in a vehicle longitudinal direction; and
a bracket arranged on an upper end portion of the center tunnel and configured to mount the side impact sensor,
wherein the side impact sensor senses a side impact load acting sideways on the body, and outputs an expansion signal to left and right side curtain airbag devices,
the bracket is formed to have a substantially M-shaped section when viewed from a front part of the body,
the bracket is a member put on the upper end portion of the center tunnel,
the bracket includes left and right vertical legs having plate surfaces pointing in a vehicle width direction, and a horizontal middle portion positioned between the left and right legs and having a plate surface pointing in a vertical direction,
the left and right legs are overlaid on and joined to left and right side surfaces or an upper surface of the center tunnel,
the middle portion is set to be lower than upper ends of the left and right legs, and overlaid on and joined to the upper surface of the center tunnel, and
left and right mounting portions for mounting the side impact sensor are formed between the middle portion and the upper ends of the left and right legs.

2. The assembly according to claim 1, wherein beads extending in a vertical direction of the body are formed on the left and right legs.

3. The assembly according to claim 1, wherein
the bracket is a product formed by bending one metal plate,
a front end and a rear end of the bracket are open ends open in the vehicle longitudinal direction, and
the left and right mounting portions include:
left and right horizontal mounting plates extending toward the vehicle width center from the upper ends of the left and right legs; and
a vertical inner plate extending downward from distal ends of the left and right mounting plates to the middle portion.

4. The assembly according to claim 1, further comprising left and right side sills positioned on two sides of the body in the vehicle width direction, and extending in the vehicle longitudinal direction, wherein the upper surface of the center tunnel is set to be lower than upper surfaces of the left and right side sills, and an upper surface of each of the left and right mounting portions is set to be higher than the upper surfaces of the left and right side sills.

5. The assembly according to claim 1, further comprising left and right side sills positioned on two sides of the body in the vehicle width direction, and extending in the vehicle longitudinal direction, and left and right floor cross members extended between the center tunnel and the left and right side sills, and configured to reinforce a floor panel, wherein the left and right floor cross members are positioned in substantially a center of the body in the vehicle longitudinal direction, the bracket is positioned near the left and right floor cross members, a harness for sending the expansion signal to the left and right side curtain airbags is connected to the side impact sensor, and the harness extends outward in the vehicle width direction along the left and right floor cross members from the side impact sensor.

\* \* \* \* \*